United States Patent Office 3,806,467
Patented Apr. 23, 1974

3,806,467
ORGANIC TIN COMPOUND CONTAINING CATALYST SYSTEM USEFUL FOR PRODUCING EPOXY COMPOUNDS
Yoshihiro Watanabe, Kobe, Toshio Nishizawa, Takatsuki, and Jiro Kobayashi, Ibaraki, Japan, assignors to Sumitomo Chemical Co., Ltd., Osaka, Japan
No Drawing. Original application Mar. 10, 1970, Ser. No. 18,335. Divided and this application Sept. 30, 1971, Ser. No. 185,369
Int. Cl. C07d 1/08, 1/06
U.S. Cl. 252—429 R                2 Claims

ABSTRACT OF THE DISCLOSURE

Catalyst system useful for producing epoxy compound containing (1) at least one organic tin compound as a first component having at least one hydroxyl group or a coordination group which is capable of being converted to a hydroxyl group in the presence of water or hydrogen peroxide and (2) a second component selected from compounds of molybdenum, tungsten, vanadium, selenium, boron and mixtures thereof.

---

This is a division of application Ser. No. 18,335, filed Mar. 10, 1970.

This invention relates to a novel method of oxidizing organic compounds and more particularly to a novel process for producing epoxy compounds from olefins in the presence of a special catalyst.

Epoxy compounds play an important role in the industry as intermediate materials for industrial chemicals, synthetic resins, rubbers, etc.

There are already known many methods of epoxidizing olefins. For example, the most typical industrial method is the gas phase oxidation of ethylene. However, such method can proceed in considerably high yields for ethylene which has the simplest chemical structure among olefins but is low in the yield for other olefins, particularly propylene, so that it has been found to be difficult to industrialize such method in respect to olefins other than ethylene.

The most widely used method of epoxidizing olefins is the so-called chlorohydrin method long known in the art. However, this method has such drawbacks as the high cost required for large electrolytic equipment, corrosion of the apparatus and the waste of expensive chlorine. Therefore, a more economical method has been strongly hoped for.

From such viewpoint, some improved methods have been proposed. Thus, for example, there has been proposed a method wherein a strong active substance such as a peracid, particularly peracetic acid is used as an epoxidizing agent for olefins. However, this method has various drawbacks that peracetic acid itself is produced from hydrogen peroxide and acetic acid or acetaldehyde and oxygen; and therefore its production cost is high, that peracetic acid is explosive and there is required a special care for its handling.

Further, there is also known an "in situ" method (I.E.C. 47, 147) wherein hydrogen peroxide is utilized as an epoxidizing agent in the presence of an acid catalyst together with a fatty acid. However, there is a great disadvantage that, due to the use of the strong acid catalyst, the formed epoxide is hydrolyzed partially to become glycol which is then partially esterified together with a fatty acid.

Also newly proposed is a method (U.S. Pats. 3,360,584, and 3,351,635) wherein an olefin and an organic hydroperoxide are brought into contact with each other in the presence of a metallic compound comprising vanadium, molybdenum, tungsten, selenium or mixture. However, such method has drawbacks that the organic hydroperoxide itself is expensive, and that, in principle, a corresponding alcohol in an amount equivalent to the formed epoxide compound is by-produced and therefore the economical merit of this method is likely to be influenced by the marketability of the by-product.

As described above, the conventional methods of epoxidizing olefins have been not fully satisfactory.

Recently hydrogen peroxide has come to be economically mass-produced due to the development of improved oxidation of secondary alcohols or quinone compounds and has come to be very cheap particularly in the state before purification or concentration.

Therefore, some attempts to utilize hydrogen peroxide directly as an epoxidizing agent have been made, e.g. Bull. Chem. Soc. Jap. 42, 1604, 69 (I), J. Org. Chem. 22, 1682, '57 (II). In the former method (I), the epoxy compounds of $C_8$, $C_{12}$ cyclic olefins are produced mainly by oxidation with hydrogen peroxide in the presence of a selenium dioxide catalyst. However a very large amount of the catalyst is required and this publication does not mention the epoxidability of aliphatic olefins. In the method (II), grycohol of $C_6$ cyclic olefin is produced mainly in the presence of such metallic compounds as of $H_2WO_4$ as catalyst.

However, a small amount of epoxy compounds have been isolated as only intermediates. What can be generally said is that, with such simple catalyst systems, the epoxidizing activity of hydrogen peroxide is so low that, as mentioned also in the above literatures, the formation of a small amount of epoxy compound is recognized only on very specific compounds, especially cyclic compounds, and the reaction proceeds to a diol in most cases. From such viewpoint, the investigation to use hydrogen peroxide directly for an epoxidation has not been established practically. Therefore, it has been necessary to convert hydrogen peroxide into a peracid as mentioned hereinbefore or to employ an organic hydroperoxide.

An object of the present invention is to provide an advantageous and industrially practical method wherein, by the adoption of newly discovered catalyst system, hydrogen peroxide may be used effectively and directly as an epoxidizing agent for the epoxidation of olefins.

It has now been found that, when a catalyst system having the below described specific composition is used dissolved or suspended in the reaction solvent and olefin, hydrogen peroxide can be advantageously used as an epoxy oxygen source.

According to the present invention, there is used a catalyst system comprising a combination of (1) at least one tin compound as a first component and (2) a second component selected from the group consisting of compounds of vanadium, molybdenum, tungsten, selenium, and boron, and mixtures of any two or more of these compounds.

As for the tin compound which is the first component, both organic tin and inorganic tin compounds may be used.

As for the organic tin compounds, there can be exemplified tin compounds having at least one hydroxyl group or having a coordination group which can be converted to a hydroxyl group in the presence of water or hydrogen peroxide. More particular examples are those having any of the following formulae:

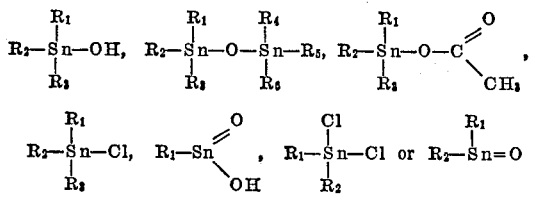

wherein each of $R_1$, $R_2$, $R_3$, $R_4$, $R_5$ and $R_6$ represents an alkyl group, aralkyl group, phenyl group, phenoxy group, alkoxy group, hydrogen atom, carbonyl group, nitrile group, hydroxyl group, acyl group, halogen group, —S—R or —O—R and R represents an alkyl or phenyl group. It is also possible to employ a synthesized solution or extract containing such tin compound.

Examples of the inorganic tin compounds, are tin chloride, tin sulfide, sodium stannate, tin oxide and organic acid salts of tin.

Generally, an organic tin compound has an activity much higher than that of an inorganic compound.

The second component of the catalyst system of this invention is selected from organic and inorganic compounds containing molybdenum, tungsten, vanadium, selenium or boron. Examples of the soluble second component are naphthenates, stearates, octoates, carbonyls, acetylacetonates polyacid, and the like, of the above-mentioned metals. Examples of the insoluble second component are oxides, ammonium salts, phosphates, nitrates, sulfates, carbonates, and the like.

In case a boron compound is used as the second component, there can be enumerated boric acid, boron trioxide, alkylboroxin, alkoxyboroxin, boric acid esters, metallic borates, halides, carbonyl compounds, alkyl boron compounds and hydrides.

Further, composite salts containing any one of molybdenum, tungsten, vanadium, selenium and boron, for example, boron tungstic acid, phosphorus molybdic acid, phosphorus tungstic acid, phosphorus vanadic acid, phosphorus selenic acid and compounds containing two or more of these elements may also be used.

The first component and second component of the catalyst to be used in the present invention may be added simultaneously as mixed in advance to the reaction system or may be added separately to the reaction system. Further, the catalyst can be used in the form of a compound or complex compound containing simultaneously a tin atom and a molybdenum, tungsten, vanadium, selenium or boron atom.

However, in the absence of any of these two components, that is, with the first component or second component alone, no sufficient epoxidizing activity can be obtained (refer to "Reference" examples given hereinafter). Thus, for example, even if a small amount of the above described tin compound is added into a mixture of hydrogen peroxide and cyclohexene and the mixture is heated to 60–80° C., substantially no chemical change occurs. Some tin compounds would serve rather as stabilizers for hydrogen peroxide. Further, on the contrary, it is known that, in case a small amount of only tungstic acid is added, a large amount of a diol or ether is produced, and substantially no epoxy compound is produced (J. Org. Chem., 22, 1682 (1957)). In sharp contrast thereto, if both are made to coexist in the reaction system, a surprisingly large amount of an epoxy compound is produced.

For the concentration of the catalyst, each of the first and second components can be selected independently over a considerably wide range. Although the ratio of the first component to the second component is not independent of reaction products, the ratio may be varied widely. But, the ratio of atom of the first component is preferable more than that of the second component. The element of the second component per one tin atom is 1–0.001, preferably 0.1–0.01. Generally, a concentration (by weight ratio) of the mixture of the first component and the second component in the reaction system is about 1/10,000 to 1/10, preferably about 1/100 to 1/1,000. However, generally, in case a boron compound is used for the second component, the higher the concentration of boron, the better the result. It is desirable therefore to use such boron compound as a saturated solution, if possible.

As regards the working mechanism of the catalyst system of the present invention, there have been recognized some phenomena which can explain that the first component, the second component and hydrogen peroxide form an active complex compound effective or favorable to the epoxidizing reaction.

The solvent to be used in carrying out the method of the present invention may be selected from a considerably wide range of ordinary organic compounds, provided that they do not quickly react with the olefin, hydrogen peroxide and/or catalyst. However, it has been found that, in some solvents, the compatibility with olefin and hydrogen peroxide is low so that the reaction system separates into a plurality of phases and, in case the reaction is continued for a long time or in case the reaction temperature is elevated, the tin compound is deposited on the wall and bottom of the reaction vessel.

From the industrial viewpoint, when the solubility and stability of the raw material olefin and catalyst system and the stability of hydrogen peroxide are considered, the proper selection of the solvent is important to the method of the present invention.

It has been found that, in case the below mentioned four operations are carried out in respect of various typical solvents, the stability of organic tin hydroxide and hydrogen peroxide is remarkably influenced, as demonstrated in Table 2 to be indicated hereinlater:

Operation 1: $(Me)_3SnOH$ and hydrogen peroxide were dissolved at the room temperature.

Operation 2: Cyclohexene was added to the above mentioned solution.

Operation 3: The resulting solution was then warmed up to 60° C.

Operation 4: Then the solution was allowed to stand at the room temperature for 3 days.

It has been observed from these results of the operations that generally alcohols such as straight chain alcohols, polyhydric alcohols and cyclic alcohols are preferable as solvents for the method of the present invention, but epoxides, ketones and furfurals can be also used. The heat of reaction in the epoxidation is considerably high so that the maintenance of the reaction temperature is an important requirement in the case of industrially working the invention. However, by properly selecting the solvent from among these solvents, the reaction temperature can be maintained constant by utilizing the boiling point of the solvent.

From the above, it will be understood that, in order to efficiently carry out the method of the present invention, the selection of the solvent is important.

In carrying out the method of this invention, there may be used commercial grade of hydrogen peroxide as such, and generally an aqueous solution of such hydrogen peroxide of a concentration of 10 to 90% may be used. However, as an industrially cheap hydrogen peroxide source, it is advantageous to use an unconcentrated unpurified intermediate product obtained by a known process for the production of hydrogen peroxide.

For example, it is known that hydrogen peroxide and ketone are obtained by atmospheric oxidization of a secondary alcohol (U.S. Pat. No. 2,871,101). However, the hydrogen peroxide obtained by such process is marketed in the form of an aqueous solution generally prepared through such steps as distillation, concentration and purification. By such after treatments, the price of hydrogen peroxide rises so surprisingly as to obstruct the industrial utilization of hydrogen peroxide. On the other hand, in the method according to the present invention, alcohols and ketones are very favorable solvents giving results rather more favorable of an aqueous solution. Therefore, the reaction product containing hydrogen peroxide, alcohol and ketone obtained by the oxidation of a secondary alcohol can be used directly as such or as more or less concentrated as a source of hydrogen peroxide for the method of the present invention.

Further, another known process for producing hydrogen peroxide by the oxidation of an anthraquinone derivative may also be advantageously combined with the epoxidation according to the present invention.

Thus, it is possible to combine the method of the present invention with an already known conventional process for the production of hydrogen peroxide, so that the method may be worked industrially advantageously.

Examples of the compounds which can be epoxidized by the method of the present invention are olefinic compounds such as propylene, normal butylene (1 or 2), isobutylene, 1,3-butadiene, allyl alcohol, methyl allyl alcohol, allyl chloride, isooctane, styrene and α-methyl styrene: unsaturated fatty acids such as soybean oil, oleic acid, etc.; cyclic olefins such as cyclohexene, 4-cyanocyclohexene, cyclooctadiene and cyclododecatriene; and the like.

It is preferable, by taking the safety into consideration, to select the initial concentration of hydrogen peroxide in the reaction mixture to be about 1 to 50% by weight. The concentration of the olefin with respect to the hydrogen peroxide may be varied over a wide range. Though not critical, it is generally economically desirable that the mol ratio of the olefin to hydrogen peroxide be 1:30 to 30:1.

The temperature to be used in the present reaction varies over a very wide range depending on the properties of olefin to be epoxidized, the concentration of the catalyst and the ratio of the olefin to the hydrogen peroxide. However, it is generally —20° C. to 150° C., preferably 0° C. to 120° C. or particularly 20° C. to 100° C.

The reaction is conducted under a pressure sufficient to maintain a liquid reaction phase. The reaction may also be conducted below the atmospheric pressure but usually a pressure of about 1 to 100 atmospheres is desirable.

The reaction time also varies depending on the properties of olefin to be epoxidized, the concentration of the catalyst, the ratio of the olefin to the hydrogen peroxide, the reaction temperature and the desired extent of the reaction. It is possible to carry out the reaction within such short time as about one minute or for a long time such as 100 hours or longer.

Thus, as explained herein above, this invention provides a novel, economical and effective method for the epoxidation of olefins. The present invention is fully distinguished from conventional methods wherein hydrogen peroxide is once converted to a peracid or organic hydroperoxide and is then used for the epoxidation. This invention has thus opened a way to the production of an epoxy compound by the direct use of hydrogen peroxide, due to the discovery of a novel and very effective catalyst system. The method of the present invention does not require the use of corrosive materials, is not bound by the by-production of any other industrial chemicals chemicals and is therefore very advantageous to the industry.

Since there is no acid catalyst which promotes the hydrolysis of the formed epoxy compound in the reaction system, the undesirable formation of glycols is remarkably prevented. This is one of the features of the method of the present invention.

The present invention will be further explained by referring to the following examples.

Example 1

There were charged 11 g. of n-propanol (as a solvent), 4.0 g. of cyclohexene and 12 g. of 90% hydrogen peroxide in a 50 cc. glass flask equipped with a reflux condenser and stirrer. Then 0.1 g. of trimethyl tin hydroxide $Me_3SnOH$ and 0.01 g. of acetylacetone molybdenum salt $MoO_2(AcAc)_2$ were added thereto as catalysts. The mixture was caused to react at 50° C. for 9 hours.

After the reaction, the hydrogen peroxide was colored with potassium iodide and was titrated with a 0.1 N sodium thiosulfate solution to quantitatively determine the unreacted hydogen peroxide.

The unreacted cyclohexene and produced cyclohexene oxide were analyzed by gas chromatographs.

As a result, the formation of 0.90 g. of cyclohexene oxide was observed. This corresponds to 90% based on the reacted hydrogen peroxide and 95% on the reacted cyclohexene.

Examples 2 and 4 to 14 and Reference Examples 1 and 2 (the use of various olefins and various combinations of catalysts)

Experiments were conducted in substantially the same manner as in Example 1 except that the combinations of the kinds of olefins and catalysts and some reaction conditions were changed. The results of the experiments are collectively indicated in Table 1.

Example 3 (the use of an extract)

The procedure of Example 1 was repeated except that a catalyst prepared in the following manner was used. Thus 1 g. of tributyl tin chloride was dissolved in an aqueous solution containing 0.5 g. of sodium hydroxide, and was made to react at 80° C .for 2 hours. Then the reaction product was extracted with ether. The results obtained by the use of 1/10 the amount of the oil layer together with 0.01 g. of $MoO_2(AcAc)_2$ to the reaction system are shown in Table 1.

Example 15 (the use of propylene)

There were charged 9.0 g. of ethanol (as solvent) into a glass autoclave of a capacity of 50 cc. Further, 4.2 g. of 70% hydrogen peroxide, 0.08 g. of trimethyl tin hydroxide and 0.014 g. of $MoO_2(AcAc)_2$ were added thereto and then the mixture was cooled in a Dry Ice-methanol bath. After evacuation, there were introduced and dissolved 3.8 g. of propylene. The autoclave was dipped in a water bath at 40° C. and the mixture was allowed to react for 20 hours while being stirred. The results of the experiment are shown in Table 1.

Examples 16, 17 and 18 (the use of various other olefins)

Reactions were conducted in the same manner as in Example 15 except that butene-1, isobutylene and butadiene (1,3) were respectively used as olefins.

The results of the experiments are shown in Table 1.

Examples 19 to 34 (effect of reaction solvent)

Operation 1: 1 ml. of each of various solvents was put into a test tube of a capacity of about 10 cc. Then 0.01 g. of trimethyl tin hydroxide and 0.1 ml. of 90% hydrogen peroxide were added thereto and the solubility was observed at the room temperature.

Operation 2: 0.5 ml. of cyclohexene was added to the solution of the Operation 1 and change in solubility was observed.

Operation 3: The solution of the Operation 2 was heated on an oil bath and, after 3 hours, the solubility was again observed.

Operation 4: The solution of the Operation 3 was cooled to the room temperature and was left for 3 days and the solubility was observed.

The results are shown in Table 2.

TABLE 1

| Example | Olefin Type | Olefin G. | Hydrogen peroxide (g.) | Catalyst | Reaction temperature (°C.) | Reaction time (hrs.) | Yield of epoxide (g.) | Remarks |
|---|---|---|---|---|---|---|---|---|
| Reference example: | | | | | | | | |
| 1 | Cyclohexene | 4.0 | 1.2 | $MoO_2(AcAc)_2$ | 50 | 9 | 0.03 | |
| 2 | do | 4.0 | 1.2 | $H_2WO_4$ | 50 | 9 | 0.05 | |
| Example: | | | | | | | | |
| 1 | do | 4.0 | 1.2 | $MoO_2(AcAc)_2$, $Me_3SnOH$ | 50 | 9 | 0.90 | Selectivity 90%.[1] |
| 2 | do | 4.0 | 1.2 | $MoO_3$, $Me_3SnOH$ | 50 | 9 | 0.88 | |
| 3 | do | 4.0 | 1.2 | $MoO_2(AcAc)_2$, $Bu_3SnOH$ | 50 | 9 | 0.80 | |
| 4 | do | 4.0 | 1.2 | $H_2WO_2$, $Me_3SnOH$ | 50 | 9 | 1.4 | Selectivity 87%.[1] |
| 5 | do | 4.0 | 1.2 | $VO(AcAc)_2$, $Me_3SnOH$ | 50 | 9 | 0.02 | |
| 6 | do | 4.0 | 1.2 | $MoO_2(AcAc)_2$, $Me_3SnOH$ | 60 | 12 | 0.80 | Glycol 0.1 g. |
| 7 | Isooctane | 7.4 | 4.2 | $MoO_2(AcAc)_2$, $Me_3SnOH$ | 50 | 5 | 0.34 | |
| 8 | Styrene | 8.0 | 1.6 | $MoO_2(AcAc)_2$, $Me_3SnOH$ | 50 | 24 | 0.10 | |
| 9 | 4-cyanocyclohexene | 9.0 | 4.2 | $MoO_2(AcAc)_2$, $Me_3SnOH$ | 50 | 4 | 0.50 | |
| 10 | Cyclooctadiene | 8.0 | 1.6 | $MoO_2(AcAc)_2$, $Me_3SnOH$ | 50 | 24 | 1.9 | [2] |
| 11 | Cyclododecatriene | 1.4 | 1.6 | $MoO_2(AcAc)_2$, $Me_3SnOH$ | 50 | 24 | 0.85 | [2] |
| 12 | Allyl chloride | 8.0 | 1.6 | $MoO_2(AcAc)_2$, $Me_3SnOH$ | 50 | 24 | 0.85 | Selectivity 83%.[1] |
| 13 | Ethyl vinyl ether | 8.7 | 1.6 | $MoO_2(AcAc)_2$, $Me_3SnOH$ | 50 | 24 | 0.30 | Selectivity 83%.[1] |
| 14 | Allyl alcohol | 8.6 | 1.6 | $MoO_2(AcAc)_2$, $Me_3SnOH$ | 50 | 24 | 0.32 | |
| 15 | Propylene | 3.8 | 4.2 | $MoO_2(AcAc)_2$, $Me_3SnOH$ | 40 | 20 | 0.21 | |
| 16 | Butene-1 | 2.6 | 1.6 | $MoO_2(AcAc)_2$, $Me_3SnOH$ | 40 | 20 | 0.31 | |
| 17 | Isobutene | 3.6 | 4.2 | $MoO_2(AcAc)_2$, $Me_3SnOH$ | 40 | 20 | 0.47 | |
| 18 | 1,3-butadiene | 2.4 | 1.6 | $MoO_2(AcAc)_2$, $Me_3SnOH$ | 40 | 20 | 0.50 | [2] |

[1] Selectivity: Mol percent of formed epoxide based on reacted hydrogen peroxide.
[2] Formation of monoepoxide.

TABLE 2

| Example number | Solvent | Operation 1 | Operation 2 | Operation 3 | Operation 4 |
|---|---|---|---|---|---|
| 19 | toluene ($CH_3$-phenyl) | Insoluble | Insoluble | Insoluble | Insoluble. |
| 20 | benzene | do | do | do | Do. |
| 21 | $CCl_4$ | do | do | Soluble | White turbid. |
| 22 | $C_2H_5OH$ | Highly soluble | Highly soluble | Highly soluble | Highly soluble. |
| 23 | epichlorohydrin ($CH_2Cl$-$CH_2$-O) | Soluble | Soluble | Soluble | Soluble. |
| 24 | ethyl acetate ($H_3C$-C(=O)-O-$H_5C_2$) | do | do | White turbid | White turbid. |
| 25 | phenol (OH-C$_6$H$_5$) | do | do | Soluble | Soluble. |
| 26 | (i-pr)$_2$O | Insoluble | Insoluble | White turbid | White turbid. |
| 27 | dioxane ($C_2H_4$-O-$C_2H_4$-O) | Highly soluble | Highly soluble | Highly soluble | Do. |
| 28 | acetone ($H_3C$-C(=O)-$CH_3$) | do | do | Soluble | Soluble. |
| 29 | Furfural | Highly soluble | Highly soluble | Highly soluble | Highly soluble. |
| 30 | $CH_3$-CN | do | White turbid | White turbid | White turbid. |
| 31 | Dimethyl formamide | do | do | Highly soluble | Do. |
| 32 | Pyridine | do | do | do | Highly soluble | Do. |
| 23 | Propylene glycol | do | do | do | Highly soluble. |
| 34 | Glycerin | do | do | do | Do. |

Example 35 (catalyst)

There were charged 6 g. of isopropyl alcohol (as solvent), 2.46 g. (30 mmols) of cyclohexene and 5 g. of an isopropyl alcohol solution of hydrogen peroxide [containing 1.02 g. (30 mmols) of hydrogen peroxide] into a 50 cc. glass flask equipped with reflux condenser and stirrer. Then 2.7 mg. of acetylacetone molybdenum salt $MoO_2(AcAc)_2$ and 150 mg. of dibutyl tin monochlorohydroxide

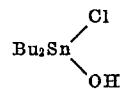

were added thereto as catalysts. The mixture was allowed to react at 53° C. for 1 hour. The product was analyzed in the same manner as in Example 1. As a result, the formation of 7.3 mmols of cyclohexene oxide was observed. This corresponded to selectivity of 81% based on the reacted hydrogen peroxide and 94% on the cyclohexene employed. Further, the formation of 0.1 mmol of cyclohexene glycol was also observed.

Examples 36 to 48 (the use of various kinds of the first components)

Reactions were conducted under the same conditions as in Example 35 except that the kind of the tin catalyst was varied. The conditions and results of the experiments are shown collectively in Table 3.

Examples 49 to 54 (the use of various kinds of the second components)

In these examples dibutyl tin monochlorohydroxide was used as a tin catalyst (the first component) but the kind of the second component was varied. The conditions and results of the experiments are shown in Table 3.

Example 55

There were added 45 g. of isopropyl alcohol, 0.90 g. of dibutyl tin monochlorohydroxide, 20 g. of an isopropyl alcohol solution containing 5.1 g. (150 mmols) of hydrogen peroxide and 0.039 g. of acetylacetone molybdenum salt into a glass autoclave of a capacity of 200 cc. After a leakage test, the autoclave was cooled in Dry Ice-methanol and evacuated. Then 12.6 g. of propylene were added thereto to cause reaction. The reaction temperature was the room temperature (26° C.). The reaction pressure was 8.3 atmospheres at the initial and was 7.2 atmospheres at final after 6 hours. After reaction, the produced gas was passed through a hydrochloric acid aqueous solution of magnesium chloride and propylene oxide was quantitatively determined. Liquid propylene oxide was quantitatively analyzed by gas chromatograph. The sum of them was made a propylene oxide yield. The quantitative determination of hydrogen peroxide was conducted in the same manner as in Example 1. The results are shown in Table 3.

Example 56 (the use of liquid resulting from oxidation of secondary alcohol)

There were added 90 g. of isopropyl alcohol and 0.7 g. of AIBN (azobisisobutyronitrile) as an initiator into a reactor made by fitting a glass vessel on the inside wall of a stainless steel autoclave of 200 cc. and fitting a stirrer also made of glass so that the reaction solution might not contact the metal. The oxidation was conducted for 5 hours by introducing pressurized air during the reaction so as to keep a reaction temperature of 130° C. and a reaction pressure of 50 kg./cm². After the reaction, the product was cooled and a part of the solution was taken and analyzed. There were found 1200 mmols of isopropyl alcohol, 150 mmols of hydrogen peroxide and 300 mols of acetone. Then, 0.9 g. of dibutyl tin monochlorohydroxide and 0.0075 g. of tungstic acid were added to this solution. Propylene was introduced thereinto to cause reaction in the same manner as in Example 55. The reaction conditions are shown collectively together with the results in Table 3.

TABLE 3

| Example No. | Olefin (mmols) | Hydrogen peroxide, mmols | Solvent,¹ grams | Catalyst 1st | Catalyst 2d | Mg. | Temperature, °C. | Time, min. | Epoxide, mmols | Selectivity On H₂O | Selectivity On olefin |
|---|---|---|---|---|---|---|---|---|---|---|---|
| 35 | Cyclohexene (30) | 30 | 9.98 (I) | BuSn(Cl)(OH) | MoO₂(AcAc)₂ (150) | (2.7) | 53 | 60 | 7.3 | 81 | 94 |
| 36 | do | 30 | 9.98 (I) | (Bu₃Sn)₂O | MoO₂(AcAc)₂ (180) | (2.7) | 53 | 60 | 2.8 | 23 | 98 |
| 37 | do | 30 | 9.98 (I) | Me₂SnOCOCH₃ | MoO₂(AcAc)₂ (110) | (2.7) | 53 | 60 | 1.1 | 15 | 84 |
| 38 | do | 30 | 9.98 (I) | BuSnCl | MoO₂(AcAc)₂ (150) | (2.7) | 53 | 60 | 2.1 | 32 | 80 |
| 39 | do | 30 | 9.98 (II) | BuSnO | MoO₂(AcAc)₂ (120) | (2.7) | 53 | 60 | 3.2 | 60 | 85 |
| 40 | do | 30 | 9.98 (II) | H⟨O⟩₂Sn(OH)₂ | MoO₂(AcAc)₂ (270) | (2.7) | 53 | 60 | 3.8 | 53 | 70 |
| 41 | do | 30 | 9.98 (III) | O⟨O⟩₂Sn(Cl)(OH) | MoO₂(AcAc)₂ (270) | (2.7) | 53 | 60 | 2.7 | 35 | 68 |
| 42 | do | 30 | 9.98 (III) | O⟨O⟩SnOH | MoO₂(AcAc)₂ (280) | (2.7) | 53 | 60 | 1.2 | 21 | 65 |
| 43 | do | 30 | 9.98 (IV) | Bu₃SnOH | MoO₂(AcAc)₂ (150) | (2.7) | 53 | 60 | 3.2 | 53 | 83 |
| 44 | do | 20 | 9.98 (IV) | Me₃SnOH | MoO₂(AcAc)₂ (90) | (2.7) | 53 | 60 | 3.4 | 70 | 97 |
| 45 | do | 30 | 9.98 (V) | SnCl₄ | MoO₂(AcAc)₂ (50) | (2.7) | 53 | 60 | 0.18 | 37 | 83 |
| 46 | do | 30 | 9.98 (I) | Sn(Oct) | MoO₂(AcAc)₂ (70) | (2.7) | 53 | 60 | 0.25 | 28 | 79 |
| 47 | do | 30 | 9.98 (I) | Na₂Sn(OH)₆ | MoO₂(AcAc)₂ (100) | (2.7) | 53 | 60 | 0.31 | 53 | 85 |
| 48 | do | 30 | 9.98 (I) | Sn(Oxa) | MoO₂(AcAc)₂ (120) | (2.7) | 53 | 60 | 2.1 | 61 | 86 |
| 49 | do | 30 | 9.98 (I) | Bu₂Sn(Cl)(OH) | P₂O₅·24MoO₃ (150) | (15) | 53 | 60 | 2.0 | 60 | 100 |
| 50 | do | 30 | 9.98 (I) | Bu₂Sn(Cl)(OH) | H₂MoO₄·H₂O (150) | (2.7) | 53 | 60 | 1.5 | 80 | 100 |
| 51 | do | 30 | 9.98 (I) | Bu₂Sn(Cl)(OH) | P₂O₅·24WO₄ (62) | (2.7) | 53 | 100 | 8.2 | 68 | 91 |
| 52 | Cyclohexene (100) | 30 | 20 (I) | Bu₂Sn(Cl)(OH) | H₂WO₄ (3.0) | (2.7) | 63 | 60 | 8.2 | 15 | 82 |
| 53 | Cyclohexene (30) | 30 | 10 (I) | Bu₂Sn(Cl)(OH) | H₂SeO₄ (100) | (3.0) | 53 | 60 | 0.8 | 10 | 80 |
| 54 | do | 30 | 10 (I) | Bu₂Sn(Cl)(OH) | V(AcAc)₃ (1.9) | (100) | 53 | 60 | 41 | 80.4 | 63 |
| 55 | Propylene (300) | 150 | 60 (I) | Bu₂Sn(Cl)(OH) | MoO₂(AcAc)₂ (900) | (29) | 26 | 300 | 19 | 49 | — |
| 56 | Cyclohexene (30) | 150 | 72 (I), 17.4 (III) | Bu₂Sn(Cl)(OH) | H₂WO₄ (900) | (7.5) | 60 | 240 | 0.02 | 50 | 53 |
| Reference Ex. 3 | do | 30 | 10 (I) | Bu₂Sn(Cl)(OH) | None | (900) | 53 | 60 | | | |

¹ Solvents = (I) Isopropyl alcohol, (II) Ethyl alcohol, (III) Acetone, (IV) Methyl ethyl ketone, (V) Furfural. Bu = Butyl group, Me = Methyl group, ⟨H⟩ = Cyclohexyl group, ⟨O⟩ = Phenyl group, (AcAc) = Acetylacetone, (Oct) = Octyl, (Oxa) = Oxalic acid.

Reference Example 3

The procedure of Example 1 was repeated except that on a tin compound (the first component of catalyst) was used. As shown in Table 3, the yield of an epoxide was slight.

Example 57 (the use of boron compound as the second components)

There were charged 12 g. of isopropyl alcohol (solvent), 4.92 g. of cyclohexene and 10 g. of an isopropyl alcohol solution containing 2.04 g. of hydrogen peroxide into a 100 cc. glass flask equipped with a reflux condenser and stirrer. Then, 0.3 g. of dibutyl tin monochlorohydroxide and 0.14 g. of boron trioxide were added thereto. The mixture was allowed to react at 60° C. for 1 hour. The product was analyzed in the same manner as in Example 1.

As a result, the formation of 7.5 mmols of cyclohexene oxide was observed. The selectivity was 7.0% based on the reacted hydrogen peroxide and 9.7% on the cyclohexene employed.

Example 58

The procedure of Example 57 was repeated except that 0.3 g. of tributyl tin chloride and 0.15 g. of boric acid were used as catalysts.

There were formed 3.1 mmols of cyclohexene oxide. The selectivity was 65% based on the reacting hydrogen peroxide and 90% on the cyclohexene employed.

Example 59

There were charged 50 g. of isopropyl alcohol (as a solvent) and 15 g. of an isopropyl alcohol solution containing 5.1 g. of hydrogen peroxide into the same reactor as in Example 56. Then 0.9 g. of dibutyl tin monochlorohydroxide and 0.4 g. of tributoxy boroxin as catalysts were added thereto. After a leakage test, the autoclave was cooled in Dry Ice-methanol and evacuated. Then 12.6 g. of propylene were added thereto and the reaction was conducted at 60° C. for 4 hours. Propylene oxide was quantitatively determined in the same manner as in Example 55. Hydrogen peroxide was quantitatively determined the same as in Example 1.

As a result, the formation of 20 mmols of propylene oxide was observed. The yield was 80% based on the reacted hydrogen peroxide.

Example 60

There were charged 90 g. of isopropyl alcohol and 0.7 g. of AIBN (azobisisobutylonitrile) as an initiator into the reactor as used in Example 56. The isopropyl alcohol was oxidized by introducing air. Thus the oxidation was conducted for 5 hours by introducing air under pressure during the reaction so that a reaction temperature of 130° C. and a reaction pressure of 50 kg./cm.² might be kept. After the reaction, a part of the cooled solution was taken and analyzed. It contained 1200 mmols of isopropyl alcohol, 150 mmols of a peroxide and 300 mmols of acetone. Then, 0.7 g. of tin oxide and 0.5 g. of boric acid were added to this solution. Propylene was introduced into the mixture to cause reaction in the same manner as in Example 59, to produce 5 mmols of propylene oxide. The selectivity was 52% based on the reacted hydrogen peroxide.

Example 61

The procedure of Example 57 was repeated except that 0.1 g. of trimethyl tin hydroxide was added instead of dibutyl tin monochlorohydroxide. There were produced 7.2 mmols of cyclohexene oxide. The selectivity was 75% based on hydrogen peroxide and 90% on cyclohexene employed.

Example 62

The same reactor was used as in Example 57 except that methanol cooled with Dry Ice was circulated in the reflux condenser to prevent the flow out of low boiling point component.

There were charged 12 g. of isopropyl alcohol (as a solvent), 4.12 g. of allyl chloride as an olefin and 10 g. of an isopropyl alcohol containing 2.04 g. of hydrogen peroxide into this reactor. Then 0.2 g. of bis(tributyl tin) oxide and 0.14 g. of boron trioxide were added thereto as catalysts. The mixture was allowed to react at 60° C. for 1 hour. There were obtained 1.2 mmols of epichlorohydrin. The selectivity was 63% on base of the hydrogen peroxide and 83% on the allyl chloride employed.

Example 63

The procedure of Example 61 was repeated except that other catalysts and solvent were employed. Thus 0.15 g. of trimethyl tin acetate and 0.14 g. of boron trioxide were used as catalysts, and 12 g. of furfural were used as solvent. There were produced 1.3 mmols of epichlorohydrin. The selectivity was 67% based on the hydrogen peroxide and 85% on the allyl chloride.

What we claim is:

1. A catalyst system consisting essentially of a combination of (1) at least one organic tin compound as a first component having at least one hydroxyl group or a coordination group capable of being converted to a hydroxyl group in the presence of water or hydrogen peroxide as represented by the formulas:

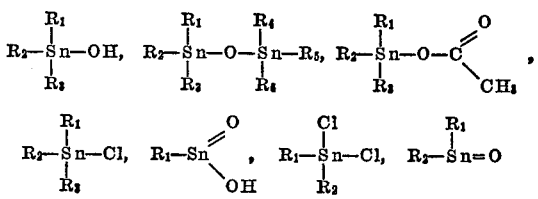

wherein each of $R_1$, $R_2$, $R_3$, $R_4$, $R_5$ and $R_6$ represents an alkyl group, aralkyl group, phenyl group, phenoxy group, alkoxy group, hydrogen atom, carbonyl group, nitrile group, hydroxyl group, acyl group, halogen group, or —S—R wherein R represents an alkyl or phenyl group, and (2) a second component selected from the group consisting of molybdenic acid, tungstic acid, selenic acid, boron tungstic acid, phosphorus molybdic acid, phosphorous tungstic acid, phosphorous vanadic acid, phosphorous selenic acid; and naphthenates, stearates, octoates, carbonyls, acetylacetonates, oxides, ammonium salts, phosphates, nitrates, sulfates or carbonates of molybdenum, tungsten, vanadium or selenium; boric acid, boron trioxide, boronhydride, boron halides and boroxin substituted with alkoxy or alkyl groups, the ratio of the second component to the first component being 1–0.001 to 1.

2. The catalyst system according to claim 1, wherein the ratio of tin atom of the first component to each of the elements of molybdenum, tungsten, vanadium, selenium or boron atom of the second component is 10–100 to 1.

References Cited

UNITED STATES PATENTS

| | | | |
|---|---|---|---|
| 2,833,788 | 5/1958 | Skinner et al. | 260—348.5 L |
| 2,892,826 | 6/1959 | Peters et al. | 252—430 X |
| 2,946,778 | 7/1960 | Ke et al. | 252—430 X |

(Other references on following page)

| | UNITED STATES PATENTS | | |
|---|---|---|---|
| 3,119,875 | 1/1964 | Steinmetz et al. | 252—431 R X |
| 3,166,547 | 1/1965 | Loeb | 252—431 R X |
| 3,210,329 | 10/1965 | Jenkins | 252—431 R X |
| 3,455,976 | 7/1969 | Wade | 252—431 R X |
| 3,156,709 | 11/1964 | Allan | 260—348.5 L |
| 3,326,949 | 6/1967 | Larson | 252—431 R X |
| 3,429,903 | 2/1969 | Larson | 252—431 R X |
| 3,507,809 | 4/1970 | Kollar | 252—430 X |

FOREIGN PATENTS 788,951   1/1958   Great Britain _____ 252—431 R

PATRICK P. GARVIN, Primary Examiner

U.S. Cl. X.R.

252—428, 430, 431 R, 431 C, 431 N; 260—348.5 L